(12) United States Patent
Nevarez et al.

(10) Patent No.: US 10,896,620 B2
(45) Date of Patent: Jan. 19, 2021

(54) PROGRAMMABLE INTERFACE FOR AUTOMATED LEARNING REFRESHERS

(71) Applicant: Microsoft Technology Licensing, LLC, Redmond, WA (US)

(72) Inventors: Alberto F. Nevarez, Sunnyvale, CA (US); Kisang Pak, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 16/003,002

(22) Filed: Jun. 7, 2018

(65) Prior Publication Data

US 2019/0378428 A1 Dec. 12, 2019

(51) Int. Cl.
| | |
|---|---|
| *A63F 9/24* | (2006.01) |
| *G09B 5/06* | (2006.01) |
| *H04L 29/08* | (2006.01) |
| *G06F 40/30* | (2020.01) |

(52) U.S. Cl.
CPC ............. *G09B 5/065* (2013.01); *G06F 40/30* (2020.01); *H04L 67/26* (2013.01)

(58) Field of Classification Search
CPC .......... G06F 40/30; H04L 67/26; G09B 5/065
See application file for complete search history.

(56) References Cited

U.S. PATENT DOCUMENTS

| | | | | |
|---|---|---|---|---|
| 8,079,066 B1 * | 12/2011 | Cordell | ................... | G06F 21/41 726/5 |
| 2003/0204981 A1 * | 11/2003 | Boling, III | .......... | G09F 23/0066 40/668 |
| 2011/0078101 A1 * | 3/2011 | Gotz | ...................... | G06Q 40/06 706/46 |
| 2011/0078160 A1 * | 3/2011 | Gotz | ................ | G06F 16/24575 707/750 |
| 2015/0325133 A1 | 11/2015 | Gaglani et al. | | |
| 2017/0286912 A1 * | 10/2017 | Zhang | ..................... | H04L 51/24 |
| 2018/0039952 A1 * | 2/2018 | Dintenfass | ......... | G06Q 10/1095 |

OTHER PUBLICATIONS

"Anki Manual", Retrieved from: https://apps.ankiweb.net/docs/manual.html, Jun. 4 ,2018, 54 Pages.
"Forgetting curve", Retrieved fom: https://en.wikipedia.org/wiki/Forgetting_curve, May 30, 2018, 3 Pages.
"Spaced repetition", Retrieved from: https://en.wikipedia.org/wiki/Spaced_repetition, May 2018, 4 Pages.
"International Search Report and Written Opinion Issued in PCT Application No. PCT/US2019/032553", dated Jul. 22, 2019, 13 Pages.

* cited by examiner

*Primary Examiner* — Steve Rowland
(74) *Attorney, Agent, or Firm* — Hickman Palermo Becker Bingham LLP; Christine E. Orich

(57) ABSTRACT

Technologies for integrating data from video-based learning resources with push messages are provided. The disclosed techniques include, in response to a playing, in learning software, of a video-based learning resource, determining a trigger event based at least partly on recall data. In response to an occurrence of the trigger event, the disclosed technologies cause insertion of a learning refresher item that includes content extracted from the video-based learning resource into a push message.

20 Claims, 7 Drawing Sheets

PROGRAMMABLE INTERFACE FOR AUTOMATED LEARNING REFRESHERS

TECHNICAL FIELD

The present disclosure relates to networked data processing systems, and more particularly to programmable interfaces for enabling communications between learning software and push messaging systems.

BACKGROUND

Online learning platforms can make video-based training courses accessible to a large population of end users because the platforms are network-based. For example, LINKEDIN LEARNING and other similar platforms provide access to video-based learning resources over the Internet. A limitation of existing online learning architectures is that they are designed using a reactive or pull-based technological paradigm. As a result, online learning sites often simply wait for and then respond to user requests.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1A:
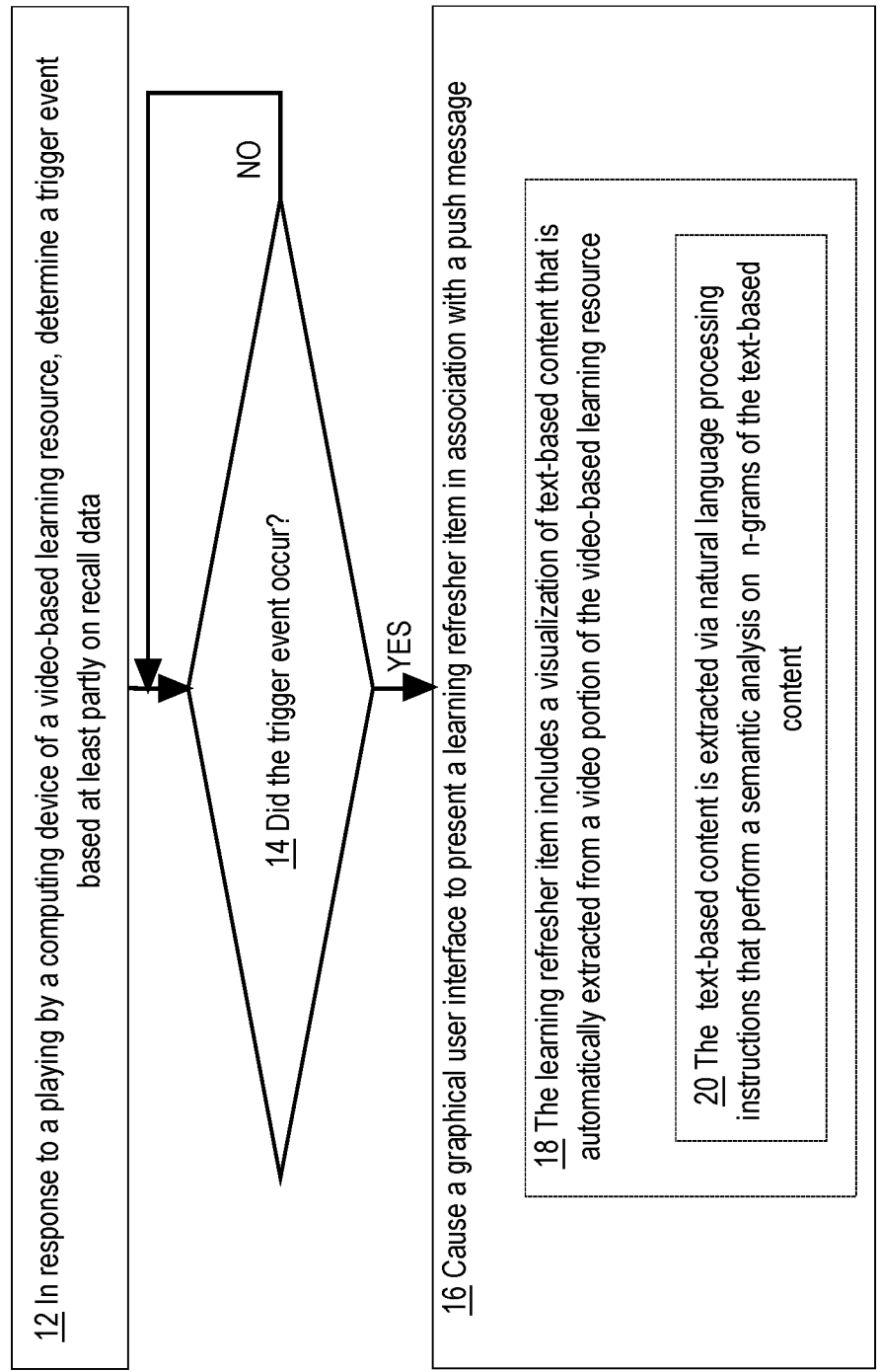
FIG. 1A is a flow diagram that depicts a process that may be performed by refresher generation software that is implemented as part of an interface between learning software and a messaging system, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Existing online learning technologies can be improved by the addition of technology that autonomously and in accordance with an intelligent schedule initiates targeted follow-up interactions with an end user related to the content of learning resources that the user has viewed through an online learning site. To that end, technologies for integrating content that has been extracted from video-based digital learning resources with electronic messages that are generated by a push messaging system are provided.

In one approach, a computing system extracts content from a video-based digital learning resource and generates one or more digital learning refresher items. A digital learning refresher item contains a subset of the content of the video-based digital learning resource, such as one or more algorithmically-determined "key takeaways" of the video-based learning resource that include actionable items. In an embodiment, a video-based learning resource is an online video of a training course and a digital learning refresher item is text-based content that is to be inserted into an electronic push message, such as a text message, an email message, or a feed module for an electronic news feed. In other embodiments, the video-based learning resource is an audio or video recording of a training course that was delivered live, or a transcript of a live training course. In an embodiment, the digital learning refresher item contains one or more sentences that have been extracted from an electronic document that contains a transcript of an online video of the training course. The one or more sentences are selected for inclusion in the digital learning refresher item based on a computed saliency measure, in an embodiment.

In an approach, recall data and/or relevance data is used to schedule one or more trigger events to cause the computing system to provide push message-based reminders of content of the video-based learning resource and thereby improve retention of the content by the user. Techniques for determining recall data are described in more detail below. Relevance data can be derived or modeled based on contextual data such as the end user's current geographic location as sensed by for example a GPS (Global Positioning System) embedded in the user's mobile computing device, the user's history of previously-viewed feed items, the time of day or day of week as determined by clock and calendar functions of the user's computing device.

A trigger event is designed to be detected by a computer after a time interval has elapsed. In an embodiment, the duration of the time interval is determined by the recall data and a previous event. For example, the time interval used to schedule a trigger event may be different depending on whether the previous event was the playing of the video-based resource or a previous trigger event causing insertion of a learning refresher item into an electronic message or presentation of a learning refresher item in a GUI.

In an approach, a trigger event occurs when, or after, a particular time interval that is determined based on the recall data expires. The recall data is a plot of estimated user retention of content viewed (or estimated user forgetting of content viewed) versus time elapsed since the content was viewed or reviewed, in an embodiment.

In response to an occurrence of a trigger event (and after a playing of the video-based learning resource), a digital learning refresher item is caused to be presented to the particular user who had previously played the video-based learning resource. In an embodiment, the digital learning refresher item is caused to be inserted into an electronic push message for presentation, in a GUI, to the particular user who had previously played the video-based learning resource. In another embodiment, the digital learning refresher item is converted to synthesized speech by text-to-speech (TTS) software and the synthesized speech is output through one or more speakers. The digital learning refresher item includes a subset of the content of the video-based learning resource that was previously played by that particular user.

The subset of the content that is incorporated into the digital learning refresher item includes one or more actionable items, such as a concrete recommendation as to an action or behavioral modification that the user can take, in an embodiment. Where multiple digital learning refresher items are extracted from the video-based learning resource, weights are assigned to the individual digital learning refresher items. The weight values are computed and adjusted based on stored user profile data.

Presentations of digital learning refresher items can be repeated in response to different trigger events. Different learning refresher items can contain different content. Different trigger events can be defined by different time intervals. The different time intervals can be determined based on the recall data and the number and/or frequency of previously detected trigger events. The form, content, timing, and/or frequency of learning refresher items can be customized according to stored learning profiles for particular users and/or specific user preferences.

In one approach, the length of a time interval associated with a trigger event increases as the number of previous presentations of learning refresher items increases. For example, if no learning refresher items have been presented, the length of the time interval between the playing of a learning resource and the trigger event may be shorter than if several learning refresher items have been presented previously.

In another approach, the time interval between presentations of learning refresher items is adjusted based on the user's viewing history across multiple training courses rather than being adjusted based on just the most recently-viewed training course. For example, presentations of learning refresher items for multiple different courses can be scheduled or consolidated so as to avoid overloading the user with many different learning refresher items in a short period of time.

In an approach, the learning refresher item includes a link that, when activated, initiates playing of a portion of the video-based learning resource that corresponds to the content that was extracted from the video-based learning resource and included in the learning refresher item. In an approach, the learning refresher item includes an input element that can receive user feedback about the learning refresher item that has been presented.

In an approach, automated natural language processing techniques are used to extract the learning refresher item from the learning resource. The natural language processing techniques extract text-based content, perform a semantic analysis on n-grams, for example bi-grams and/or tri-grams, of the text-based content to group the n-grams according to topics, rank the topics according to a saliency measure, search the text-based content for sentences that match the most highly ranked topics, and select a subset of the sentences for inclusion in the learning refresher item. The saliency measure is indicative of the substantive importance of a topic relative to other topics that are found in the text-based content.

In some embodiments, the substantive importance is determined at least in part based on an actionable rating value which represents the degree to which the topic appears, based on the natural language processing, to contain one or more actionable items of content. For example, the saliency measure includes a count of the number of verbs in the topic, in an embodiment, such that a topic that contains a higher number of verbs is assigned a higher actionable rating value and is thereby prioritized over other topics with lower verb counts.

In some embodiments, the substantive importance is weighted based on stored user profile data. For example, the saliency measure includes a count of the number of times a topic matches a word or phrase contained in stored user profile data, such that a topic that contains more words or phrases that match the stored user profile data is ranked more highly than other topics that have fewer words or phrases that match the stored profile data.

In some embodiments, the saliency measure is adjusted based on whether the portion of the video-based learning resource that includes the topic was actually watched by the user, such that the learning refresher item is tailored to the user in that it is linked specifically with only those portions of the video-based learning resource that the particular user actually watched. To accomplish this, a watched flag is created during the user's viewing of the video-based learning resource and is extracted and stored along with the other content that is extracted from the video-based learning resource. In this way, the disclosed process for generating learning refresher items avoids showing segments of a video-based learning resource that the user never watched. Thus, in some embodiments, the system filters topics by the watched flag and only surfaces as learning refresher items that contain those segments of a particular video that were watched by the particular user, and does not surface other segments of the video that were not watched by the user.

In other approaches, natural language processing techniques are supplemented with or replaced by other methods of determining content of the learning refresher item. For example, the learning refresher items are manually authored, for instance by an instructor or a student of the training course, in an embodiment.

In some embodiments, the video-based learning resource includes interactive elements that allow the user to add comments and highlighting, or to 'like' the resource or a particular portion of the resource. In these embodiments, the disclosed approaches can utilize these user-provided markups (comments, highlighting, likes, etc.) in determining the saliency measure of a particular topic. For example, the disclosed techniques can increase the ranking of a topic that is extracted from a highlighted or 'liked' portion of a learning resource, based on the detection of the highlighting or 'like'. User-inserted comments, if present, can be analyzed using the disclosed natural language processing techniques in the same manner as other portions of the video-based learning resource, but are flagged as user-provided. In response to detecting the user-provided flag, the system can increase the ranking of a topic that is extracted from the user-provided content (e.g., comments).

Approaches described herein address the technical limitations of pull-based online learning systems. The disclosed approaches improve upon known systems by providing a programmable interface between a pull-based online learning system and a push-based messaging system.

Through the use of the disclosed approaches, content previously only provided through the pull-based online learning mechanism can be made accessible through push-based technologies according to a schedule that is determined and/or adjusted at least partly based on recall data. Network resources such as bandwidth can be utilized in a more efficient manner as a result of these improvements. This is because the size of the content that is transmitted over the network for subsequent viewings of an online learning resource is smaller than the size of the entire learning resource, since the learning refresher items only contain certain subsets of the learning resource (for example, algorithmically-determined "salient" portions of the learning resource). Additionally, by scheduling and adjusting the re-play frequency of learning refresher items programmatically based on recall data and/or prior viewing history, the disclosed approaches offer the potential to optimize the learning refresher re-play frequency and thereby free up network resources to be used for other tasks and purposes.

Automated Insertion of Refresher into Push Message

FIG. 1A is a flow diagram that depicts a process 10 that may be performed by one or more components of a computing system 100, shown in FIG. 1C, described below. For example, process 10 may be performed by refresher generation software 48, shown in FIG. 1B, described below. Refresher generation software 48 may be a component of a programmable learning/messaging interface 122, which provides an interface through which an online learning system 102 and a messaging system 120 may communicate data and/or computer instructions to one another. Portions of process 10 may be performed by a single entity or program or by multiple entities or programs, including for example a browser plug-in and a remote server. The operations of the process as shown in FIG. 1A can be implemented using processor-executable instructions that are stored in computer memory. For purposes of providing a clear example, the operations of FIG. 1A are described as performed by computing device(s) 110, 160, which may be individually or collectively referred to simply as a 'computing system.'

In operation 12, process 10 determines, based at least partly on recall data, a trigger event, in response to a playing by a computing device of a video-based learning resource. As used herein, a trigger event may refer to a computer system event, for example an event detected by a sensor or an input/output device or an event generated by an operating system. When a trigger event is detected, the computing system opens a communication interface between online learning system 102 and messaging system 120. In an embodiment, a trigger event is an expiration of a time interval, where the time interval is determined based at least partly on recall data. The communication interface is a networked digital communications path for data communications, which is established using for example an HTTP (Hyper-Text Transfer Protocol) or an SSL (Secure Sockets Layer) network communications protocol.

Figure 3:
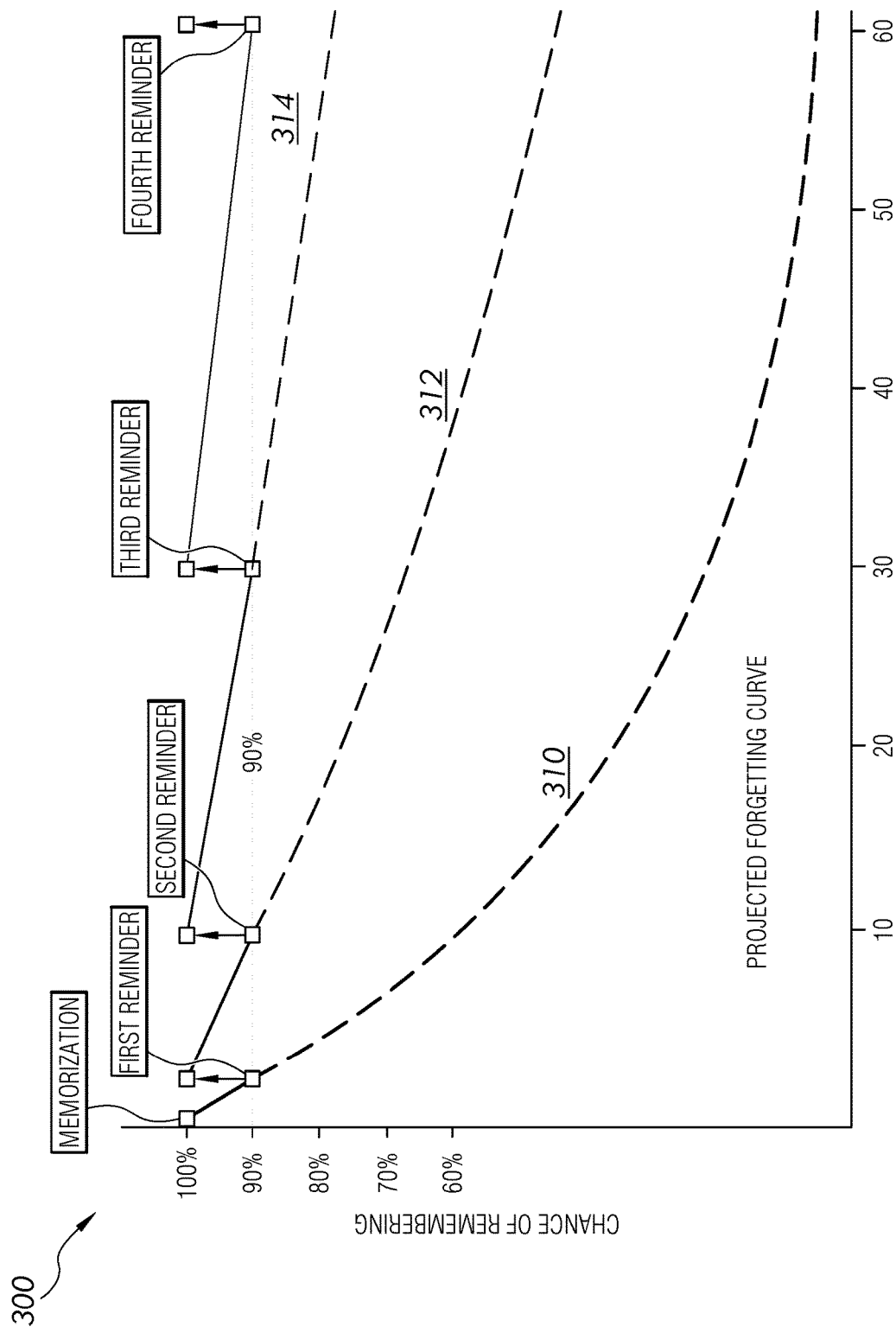
FIG. 3 is an example graph representation of recall data, in an embodiment.

Recall data as used herein may refer to stored data such as a projected forgetting curve (also referred to as an estimated retention curve). An example of a projected forgetting curve is shown in FIG. 3, described below. Recall data includes mathematically, for example probabilistic or statistical, computed estimates of the likelihood that a person will, over time, retain or forget content that the person has previously viewed through a graphical user interface of an online learning system. For purposes of operation 12 of FIG. 1A, recall data can be variable over time in relation to the number of times a particular content item has been presented to a user through a graphical user interface. Recall data also can be adjusted based on user feedback, using for example an adaptive learning process. Based on these and/or other factors, the process of determining a trigger event can produce a different output as the trigger event each time operation 12 is executed, although the output is based at least partly on the recall data.

In an embodiment, a trigger event is a future timestamp that is computed either by adding a time interval that is determined based on the recall data to a timestamp that is associated with the playing of the video-based learning resource, or by adding a time interval to a timestamp that is associated with the occurrence of a previous trigger event. Other examples of possible trigger events are web browser refresh events and login events. Scrolling events and other human-computer interactions that occur when a user is actively using software other than the learning software, for instance while the user is scrolling through a news feed or browsing a social network, are other forms of trigger events.

In operation 14, process 10 monitors for an occurrence of the trigger event that was determined in operation 12. In an embodiment, process 10 periodically compares the current computing system clock time (date/time) to the future timestamp associated with the trigger event. When the current date/time matches or exceeds the future timestamp, process 10 proceeds to operation 16. If the current date/time does not match or exceed the future timestamp, process 10 continues monitoring the current date/time and comparing the current date/time to the future timestamp associated with the trigger event. In other embodiments, operation 14 monitors signals received by an input/output device such as a touchscreen, speaker, or keypad and compares those signals to the trigger event. When the monitored input signal matches the trigger event, process 10 proceeds to operation 16.

In operation 16, process 10 causes a graphical user interface to present a learning refresher module in association with a push message. To do this, process 10 obtains a learning refresher item from online learning software and transmits or exposes the learning refresher item to a push messaging system for inclusion in a push message. As used herein, push message may refer to a push notification, a text message, an email message, or any other form of electronic message that is output in response to a sensed or machine-detected stimulus rather than in response to an explicit user request to view or receive the message. In other words, to the end user, the push message appears automatically in the graphical user interface without the user providing an explicit request to receive or view the message.

In optional operation 18 of operation 16, process 10 obtains the learning refresher item by extracting text-based content from a video portion of the video-based learning resource. In an embodiment, operation 18 uses automated information extraction and data transformation techniques to obtain the text-based content of the video-based learning resource. In an embodiment, a SPARK SQL query is run on a HADOOP data source that stores the video-based learning resource, through an application programming interface provided by the learning software. The query results are in the form of a text blob, which is stored in a CSV file. In an embodiment, a visualization of portions of the text-based content, such as a text window or feed module, is created and forms part of the learning refresher item that is then displayed in the graphical user interface by operation 16.

Figure 2:
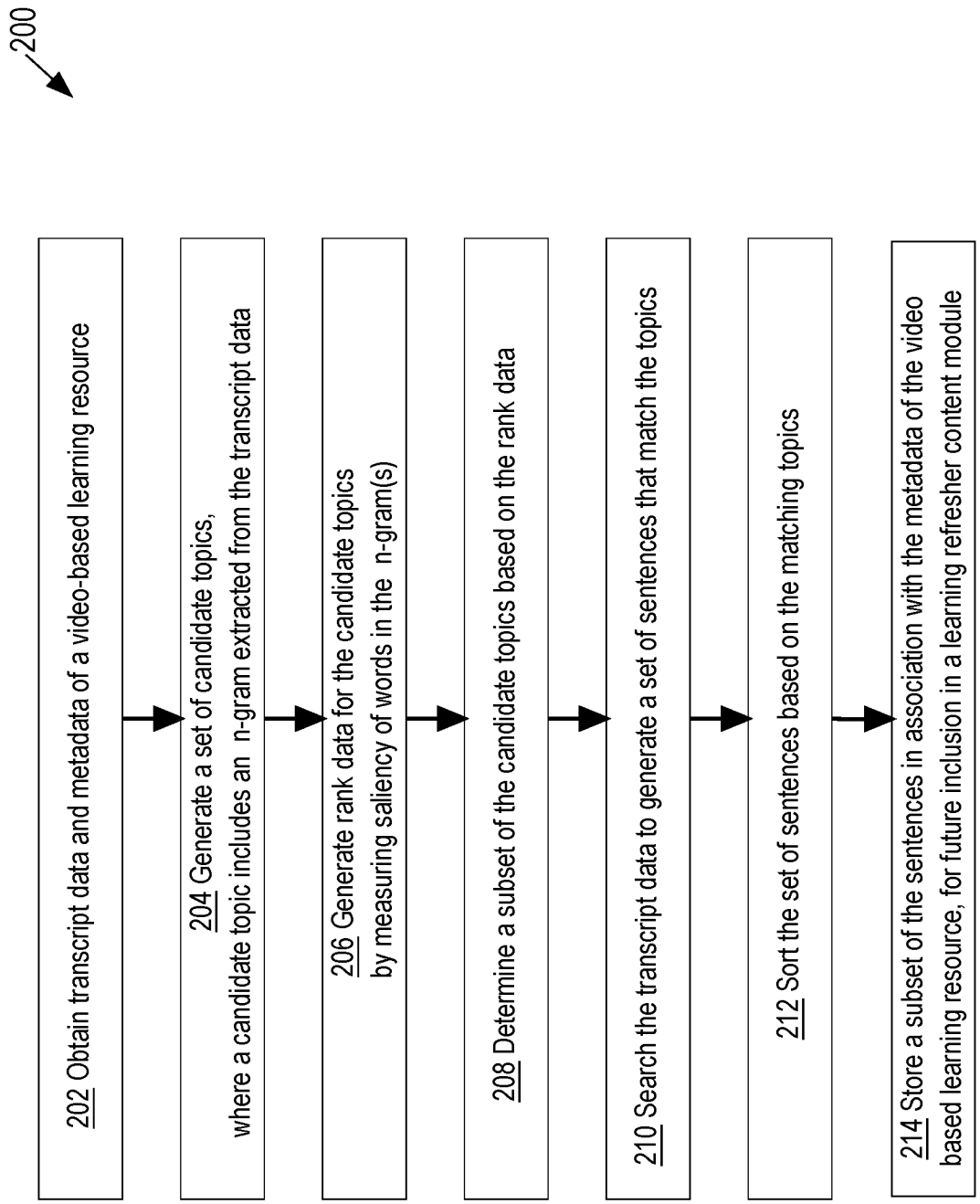
FIG. 2 is flow diagram that depicts a process for extracting information from a video-based learning resource, in an embodiment.

In optional operation 20 of operation 18, the text-based content extracted from the video-based learning resource in operation 18 is further processed using natural language processing techniques, which perform a semantic analysis on tri-grams of the text-based content to identify salient sub-portions of the text-based content. Thus, in an embodiment, the visualization displayed in the graphical user interface by operation 16 includes the salient sub-portions alternatively or in addition to the portions of the text-based content that are output by operation 18. An embodiment of natural language processing techniques that can be used to generate the salient sub-portions of the text-based content is shown in FIG. 2, described below.

Learning/Messaging Interface

Figure 1B:
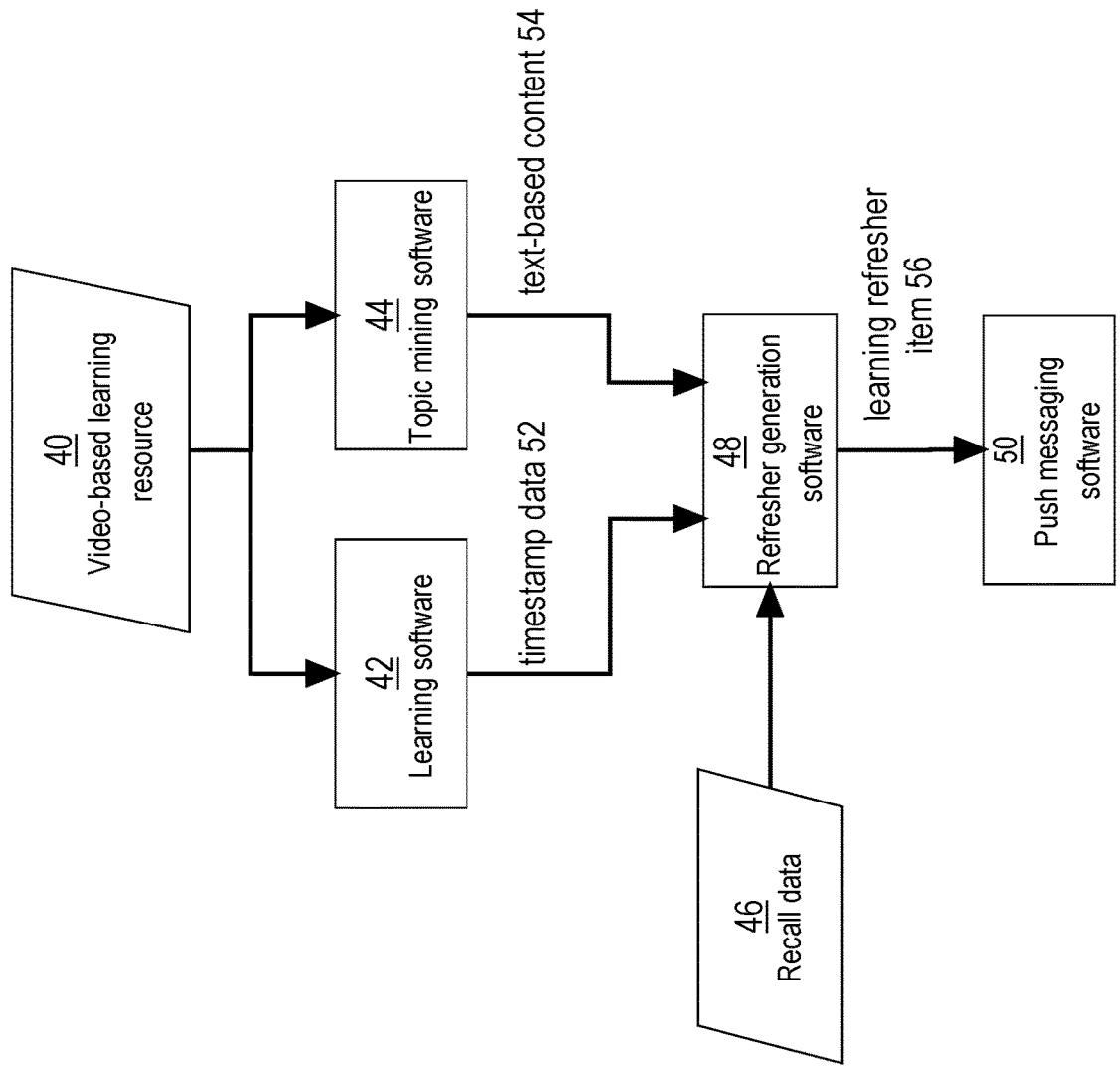
FIG. 1B is a block diagram that depicts an example system for providing an interface between learning software and a messaging system, in an embodiment.

FIG. 1B is a block diagram that depicts an example system for providing an interface between online learning system 102 and messaging system 120, in an embodiment. As used herein, "interface" may refer to an application programming interface (API) or more simply to computer code written for a databased driven web application or a database driven mobile app to perform the described functionality. In an embodiment, the computing system includes or has access to searchable stored data sources, such as databases and electronic files, that store video-based learning resource 40 and recall data 46. In an embodiment, video-based learning resource 40 is an e-learning module that contains an educational course, program, or degree, which is delivered completely online. Video-based learning resource 40 contains one or more video clips of instructional content and may contain other elements, such as downloadable documents, web links, social media elements, online chat elements, gaming elements. The components of video-based learning resource 40 are stored in a data structure that is capable of grouping and organizing different forms of related content.

Video-based learning resource 40 is input to learning software 42 and topic mining software 44. Learning software 42 is the online learning (or e-learning) software through which video-based learning resource 40 is presented to end users. As such, learning software 42 includes video player software and a graphical user interface. When an end user plays video-based learning resource 40 through learning software 42, learning software 42 records timestamp data 52.

Timestamp data 52 includes the date(s) and time(s) that a particular end user interacted with the learning software 42 to view the video-based learning resource 40, as well as the end user's account identifier. In an embodiment, timestamp data 52 also includes interaction data that indicates the types of interactions made by the user with the content (for example, preview, play, fast forward, pause, rewind, quit) and the segment(s) of the video-based learning resource 40 involved in the interaction. A segment of the video-based learning resource 40 is denoted by a start time and an end time of an interaction, in hours, minutes and seconds, in an embodiment (for example, "user123: view; start:1:30; end: 2:55"). Thus, in some embodiments, timestamp data 52 implicitly or explicitly includes a watch flag, as described above.

Timestamp data 52 also includes metadata about the video-based learning resource 40, such as a unique identifier and title, in an embodiment. Timestamp data 52 also includes a "watched" flag that learning software 42 associates with particular segments of the video-based learning resource 40 that learning software 42 detects as having been actually played/watched by the user. Learning software 42 transmits to or exposes via an application programming interface (API) timestamp data 52 for use by refresher generation software 48, described below. Timestamp data 52 is user-specific; thus, learning refresher items generated based on timestamp data 52 are also user-specific. At an implementation level, timestamp data 52 and learning refresher items are stored in a database and are linked, in the database, to a user-specific identifier such as a user account name or account number. User profile data associated with the user-specific identifier is accessible to the refresher generation software 48 through this database link.

Topic mining software 44 extracts text-based content 54 from video-based learning resource 40. In an embodiment, data transformation operations are performed on the text-based content 54 prior to topic mining. Data transformation operations include generating a blob data structure that includes text phrases and corresponding timestamp data extracted from a transcript of one or more video portions of the video-based learning resource 40, and course metadata such as course title, URL (Uniform Resource Locator) link to the storage location of the video-based learning resource 40, and a thumbnail image that represents the course.

After the data transformation operations, topic mining operations, including a series of natural language processing (NLP) operations, are performed by topic mining software 44 to produce a set of candidate topics, in an embodiment. The NLP operations include a sequence of part-of-speech (POS) tagging, POS pattern matching, topic pruning, stemming, stop word removal, synonym merging, and merging of semantically-related lexical items, in an embodiment. In other embodiments, statistical and probabilistic methods, such as TF-IDF (term frequency-inverse document frequency), co-occurrence, and LDA (Latent Dirichlet Allocation) are performed by topic mining software 44 alternatively or in addition to the NLP-based techniques.

Topic mining software 44 performs topic ranking operations to rank the candidate topics and select a set of most highly ranked topics. A topic includes an n-gram, such as a consecutive sequence of words, or a set of words where the words are not consecutive. For example, topic mining software 44 operating on the sentence, "The best practice of management is to be open and transparent with colleagues" may output a topic of "practice management open," where insignificant words (such as articles like "a" or "the" are omitted from the topic. Topic mining software 44 can, however, utilize n-grams of any length, including unigrams, bi-grams, tri-grams, etc. In one embodiment, topic mining software looks first for higher-order n-grams, such as tri-grams, and then conducts searches for lower-order n-grams if the search for tri-grams does not return desired results. For example, Topic mining software 44 may use a bi-gram to identify a topic if the software is unable to identify any tri-grams.

Alternatively, or in addition, topic mining software 44 performs a qualitative analysis on n-grams. In an embodiment, the qualitative analysis compares the n-grams to data stored in, for example, a dictionary database or a user-specific profile, in order to determine a relative measure of quality of a particular n-gram. For example, the word "persistence" may be ranked more highly by the qualitative analysis than the phrase "is kind of," even though the phrase "is kind of" contains a higher number of words (i.e., "persistence" is assigned a higher qualitative score even though "is kind of" is a tri-gram and "persistence" is a unigram).

Topic mining software 44 searches the blob created by the data transformation operations for sentence(s) in the text-based content 54 that match the most highly ranked topics. Topic mining software 44 transmits to or exposes via an application programming interface (API) portions of the text-based content 54, such as a set of sentences that matches the most highly ranked topics, for use by refresher generation software 48, described below. The "watched" flag data is included with the text-based content 54 that is output by topic mining software 44, in some embodiments. An embodiment of topic mining software 44 is described in more detail below, with reference to FIG. 2.

Refresher generation software 48 fetches a subset of the text-based content 54 in response to occurrence of a trigger event. Refresher generation software 48 accesses recall data 46 and determines trigger events by adding time interval data stored in the recall data to timestamp data 52 supplied by learning software 42, in an embodiment. Refresher generation software 48 monitors computer clock data for occurrences of trigger events. Refresher generation software 48 generates learning refresher item(s) 56 by querying the text-based content 54 for a set of sentences that match a key takeaway criterion.

The key take-away criterion is a measure of saliency of topics that match the sentences, in an embodiment. Saliency is determined by, for example, computing a semantic distance between a highly ranked topic and a sentence. Sentences that have a shorter semantic distance to a larger number of highly ranked topics are tagged as highly salient in relation to the particular video-based learning resource 40, in an embodiment.

The key take-away criterion and the set sizes of the topic sets and sentence sets are variable according to the requirements of a particular design or implementation of the computing system. For example, user-specific weight values, watch flags, and actionable ratings are used to prioritize the topics or sentences. In response to detecting an occurrence of a trigger event, refresher generation software 48 outputs learning refresher item(s) 56 for insertion into push-based messages by push messaging software 50.

Networked System Example

Figure 1C:
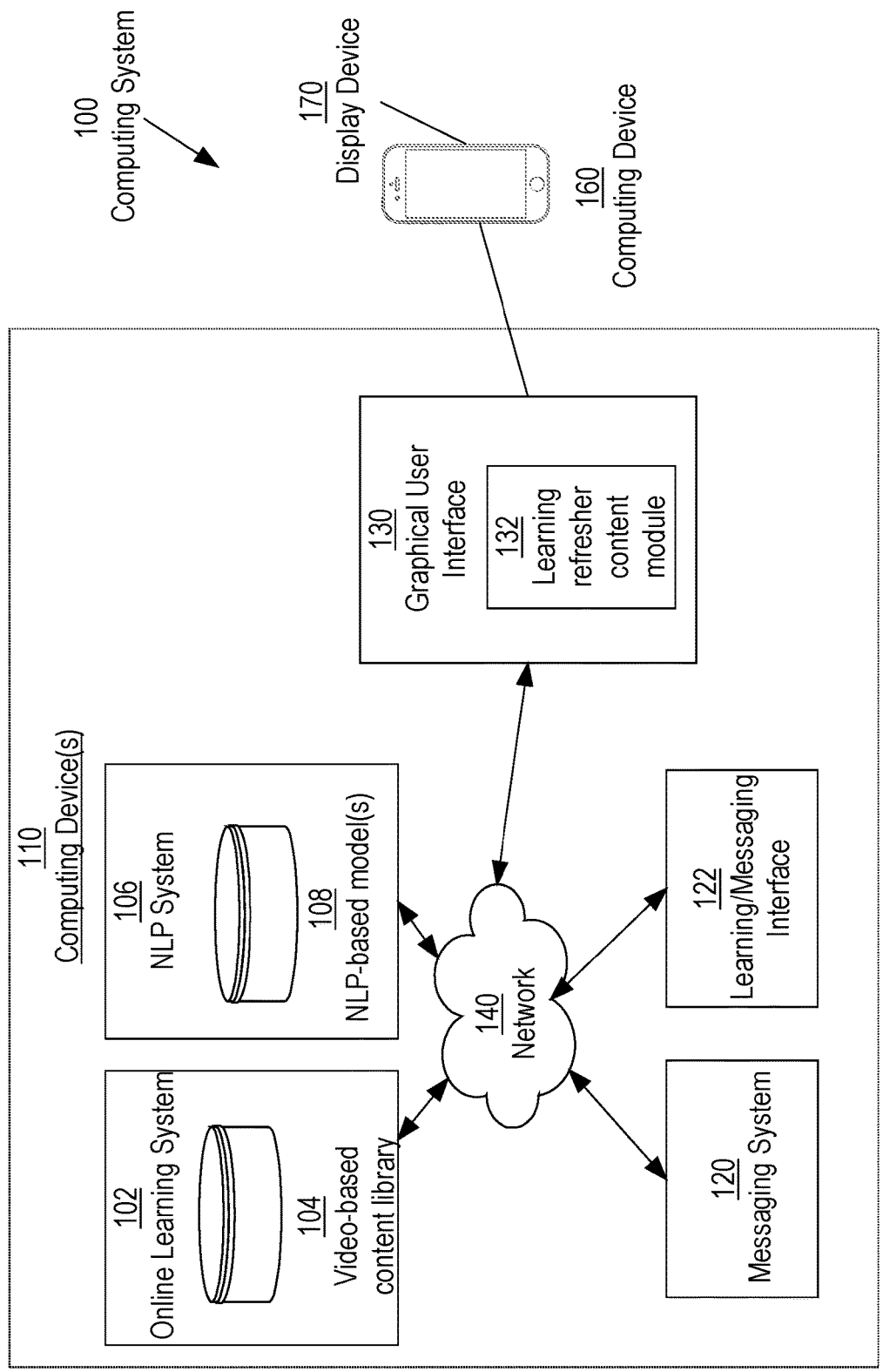
FIG. 1C is a block diagram of a networked computing system in which an interface between learning software and a messaging system may be implemented.

FIG. 1C is a block diagram of an example computing system 100 in which an interface between an online learning system and a messaging system may be implemented. Computing system 100 includes at least computing device(s) 110, computing device 160, and display device 170, which are communicatively coupled to an electronic communications network 140.

Implemented in the devices 110, 160, 170 using computer software, hardware, or software and hardware, are combinations of automated functionality embodied in computer programming code, data structures, and digital data, which are represented schematically in FIG. 1 as online learning system 102, video-based content library 104, NLP system 106, NLP-based model(s) 108, messaging system 120, learning/messaging (L/M) interface 122, graphical user interface 130, learning refresher content module 132. System as used in this disclosure may refer to a single computer or network of computers and/or other devices. Computing device as used in this disclosure may refer to a computer or any other electronic device that is equipped with a processor.

Although computing system 100 may be implemented with any number N (where N is a positive integer) of online learning system 102, video-based content library 104, NLP system 106, NLP-based model(s) 108, messaging system 120, learning/messaging (L/M) interface 122, graphical user interface 130, computing devices 110, display devices 170 and computing devices 160, respectively, in this disclosure, these elements may be referred to in the singular form for ease of discussion.

Also, online learning system 102, video-based content library 104, NLP system 106, NLP-based model(s) 108, messaging system 120, learning/messaging (L/M) interface 122, messaging system 120, learning/messaging (L/M) interface 122, graphical user interface 130 are shown as separate elements in FIG. 1 for ease of discussion but the illustration is not meant to imply that separation of these elements is required. The illustrated systems (or their functionality) may be divided over any number of physical systems, including a single physical computer system, and can communicate with each other in any appropriate manner.

The illustrative online learning system 102, NLP system 106, NLP-based model(s) 108, messaging system 120, learning/messaging (L/M) interface 122, messaging system 120, learning/messaging (L/M) interface 122, graphical user interface 130 are communicatively coupled to computing device 160 and to network 140. Portions of online learning system 102, NLP system 106, NLP-based model(s) 108, messaging system 120, learning/messaging (L/M) interface 122, messaging system 120, learning/messaging (L/M) interface 122, graphical user interface 130 may be implemented as web-based software applications and hosted by a hosting service (not shown). For example, graphical user interface 130 may be implemented within a front-end portion of online learning system 102 or messaging system 120, or embedded within another application, such as a social media application or a video sharing platform. In an embodiment, portions of graphical user interface 130 are implemented in a web browser that can be execute on computing device 160.

In some embodiments, computing device 160 is a client computing device, such as an end user's smart phone, tablet, mobile communication device, wearable device, smart appliance, or laptop machine, and computing device 110 is a server computer or network of server computers located on the Internet, in the cloud. As illustrated in FIG. 1, display device 170 is implemented in computing device 160 but may be implemented as a separate device or as part of another device, or as multiple networked display devices, in other implementations.

The example online learning system 102 is an online learning platform such as LINKEDIN LEARNING. In other embodiments, online learning system 102 may be implemented within a general-purpose video sharing platform or as part of an enterprise software suite that is accessed by a corporate intranet, for example. Video-based learning resources 40 are maintained by online learning system 102 and stored in video-based content library 104, which is implemented using a conventional searchable database, in an embodiment.

NLP (natural language processing) system 106 is a computer-implemented natural language processing service that maintains and updates NLP-based programs, including topic mining software 44 and NLP-based model(s) 108. NLP-based model(s) 108 store information, such as rules, algorithmic instructions, and parameters, that is used by topic mining software 44 to make decisions as to which n-grams to extract from text-based content, how to identify, combine, and rank topics, and how to match sentences to topics. NLP-based model(s) 108 are configurable according to the requirements of a particular design or implementation of the computing system 100. Illustrative embodiments of NLP system 106 are described in more detail with reference to FIG. 1B and FIG. 2.

Messaging system 120 is a messaging system, such as a news feed, a push notification system, a text notification system, or an email system, that includes push messaging or email functionality One specific but nonlimiting example of a push messaging system is the news/content feed on the LINKEDIN professional social media platform. In some embodiments, messaging system 120 includes, as additional or alternative functionality, a text-to-speech processor that converts the text-based learning refresher items to synthesized speech, to produce audio-based learning-refresher items for output through one or more speakers.

Learning/messaging interface 122 provides a programmable interface that is interposed between online learning system 102 and messaging system 120. Portions of refresher generation software 48 are implemented as part of learning/messaging interface 122, in an embodiment. Learning/messaging interface 122 facilitates the creation of learning refresher items. In an embodiment, learning/messaging interface 122 facilitates the extraction of selected portions of text-based content 54 from video-based learning resources 40 played through online learning system 102 and insertion of those selected portions of text-based content 54 into electronic messages, such as push messages or email messages or audio messages, generated by messaging system 120. In some embodiments, the selected portions of text-based content 54 used by learning/messaging interface 122 to facilitate creation of learning refresher items includes student notes or other content input by the user who previously viewed the training course. In other embodiments, learning/messaging interface 122 obtains previously created and stored learning refresher items from computer memory or through user interaction with an input device of the computing system.

Network 140 may be implemented on any medium or mechanism that provides for the exchange of data between the devices that are connected to the network. Examples of network 140 include, without limitation, a network such as a Local Area Network (LAN), Wide Area Network (WAN), Ethernet or the Internet, or one or more terrestrial, satellite or wireless links.

Computing device 160 communicates with display device 170 and operates graphical user interface 130 to establish logical connection(s) over network 140 with portions of online learning system 102, NLP system 106, messaging system 120, either directly or via learning/messaging interface 122. Learning refresher content module 132 is a graphical user interface element, such as a text window or a feed module, or an email message window, or a text message thread, which displays learning refresher item(s) 56 and/or additional information.

In an embodiment, learning refresher content module 132 contains a hyperlink that deep links directly to the particular segment of a video-based learning resource 40 that corresponds to the learning refresher item 56 that is displayed in the learning refresher content module 132. This is made possible by the online learning system 102 back end, which stores and maintains a mapping between the text-based content 54 and their corresponding locations in the video portion of the video-based learning resource 40, where the locations of the text-based content 54 in the video portion are designated by the time in the video at which the text-based content 54 is discussed.

In an embodiment, learning refresher content module 132 contains an input box and/or interactive GUI elements that allow the user to input feedback relating to the learning refresher item 56 that is displayed in the learning refresher content module 132.

Generation of Learning Refresher Items

FIG. 2 is flow diagram that depicts a process 200 that can be performed by computing system 100 to extract information from a video-based learning resource, in an embodiment. Process 200 may be performed by a single entity or program or by multiple entities or programs, including for example a browser plug-in and a remote server. The operations of the process as shown in FIG. 2 can be implemented using processor-executable instructions that are stored in computer memory. For purposes of providing a clear example, the operations of FIG. 2 are described as performed by computing device(s) 110, 160, which may be individually or collectively referred to as simply a 'computing system.'

In operation 202, process 200 obtains transcript data and metadata of a video-based learning resource. The transcript data and metadata are obtained through an API that is provided by the learning software 42, in an embodiment. In operation 204, process 200 generates a set of candidate topics, where a candidate topic includes at least a tri-gram extracted from the transcript data. To generate the set of candidate topics, a topic mining system that includes a pipeline of NLP modules is used. The pipeline of NLP modules includes a POS tagging module, a POS pattern matching module, and a series of topic pruning modules including a stemming module, a stop word removal module, a synonym merging module, and a semantic merging module for merging semantically-related lexical items.

The POS tagging module tags each sentence in the transcript data to obtain POS tags for the individual words in the sentence: nouns, verbs, adjectives, and adverbs. In an embodiment, the Stanford Log-linear POS tagger is used to produce a sequence of POS tags for each sentence in the transcript. The POS tags that are used in an embodiment are obtained from the Penn Treebank English POS tag set.

The POS pattern matching module selects POS tag sequences that match a predefined POS pattern. A set of predefined POS patterns used by the POS pattern matching module is stored in NLP-based model(s) 108, in an embodiment, and can be customized based on the requirements of a particular design or implementation of the system. Examples of POS patterns are noun phrases, verb phrases, noun and verb phrases. POS patterns correspond to topics. In an embodiment, POS patterns that include n-grams, are used as topics. In another embodiment, POS patterns that include at least tri-grams are used as topics and n-grams that are smaller than a tri-gram are not used as topics. In an embodiment, two different types of topics are used: entities and events. An entity topic is defined by a noun phrase that represents an entity such as "cherry pie." An event topic is defined by a noun phrase plus a verb phrase, which represents an action associated with an entity. Another type of event topic is a verb phrase plus modifiers plus a noun phrase, which represents an event in the form of a verb phrase followed by a noun phrase, where the verb phrase may be separated from the noun phrase by modifiers like pronouns or numbers. The POS pattern matching module scans the POS tag sequences for each sentence and looks for matches with any of the predefined POS patterns, and outputs any matches as candidate topics. Topic pruning removes unnecessary phrases and includes stemming, removing stop words, and merging synonyms and semantically-related lexical items. Topic pruning combines synonyms and semantically-related lexical items into common topics using stored reference data such as a synonym dictionary and a lexical database. After topic pruning, the set of candidate topics is refined and clarified.

In operation 206, process 200 generates rank data for the candidate topics that are output by the topic generation processes described above. In an embodiment, frequency of occurrence is used as a measure of saliency of a topic. The rank data includes an algorithmically computed numerical value that represents the frequency of occurrence of the candidate topic in the transcript data. In an embodiment, the TF-IDF value is calculated for each cleaned candidate topic extracted from the transcript data, and the candidate topics are ranked according to the TF-IDF value. In operation 208, a subset of the candidate topics is selected as the most important topics. The subset of most important topics is determined by selecting topics that appear in the top of the ranked list. In operation 210, process 200 runs a search query on the transcript data to search the transcript data for sentences that match the topics in the set of most important topics that was generated by operation 208. In operation 212, process 200 sort the set of sentences based on the occurrences of terms of the matching topics. For example, a sentence that has multiple occurrences of a word that appears in multiple topics would appear higher in the sorted list of sentences while a sentence that has only one occurrence of a word that appears in only one of the topics would appear lower in the sorted list of sentences. In operation 214, process 200 stores a subset of the sentences in association with the metadata of the video-based learning resource, for future inclusion in a learning refresher content module. In an embodiment, process 200 select the top N (where N is a positive integer) sentences from the top of the sorted list of sentences generated by operation 212 and stores them in memory for use by refresher generation software 48 when a trigger event occurs.

Determining Trigger Events Based on Recall Data

FIG. 3 is an example graph representation 300 of recall data, in an embodiment. In FIG. 3, recall data is plotted according to relationships between a percentage chance of remembering learned subject matter and a number of days since the learning occurred. Recall curve 310 is a first projected forgetting curve that predicts, for example, that only 60% of learned subject matter will be retained in the learner's memory 10 days after the learning event. Recall curve 312 illustrates how a first reminder given at 90% recall alters the slope of the recall curve. As a result of the first reminder, recall curve 312 supersedes recall curve 310 and now predicts that 60% of learned subject matter will be retained approximately 30 days after the initial learning event. A second reminder further improves the chance of remembering, adjusting the slope to create a new recall curve 314 that supersedes recall curve 312. According to recall curve 314, the issuance of the first, second, and third reminders improves the learner's chance of retaining the learned subject matter to approximately 80% even 60 days after the initial learning event. In an embodiment, the recall data including the set of recall curves is customized based on subject matter and/or user profiles or preferences, and thus may be different for different subject matter and/or for different users.

FIG. 3 also illustrates that the time intervals between the first, second, third, and fourth reminders is not the same but increases with each successive reminder. Using recall data such as shown in FIG. 3, learning refresher generation software 48 may define a first trigger event by a time interval of 5 days after a playing of a video-based learning resource. When refresher generation software 48 determines that the 5 days has passed, the learning refresher generation software 48 initiates insertion of a learning refresher item in a push message, corresponding to the first reminder of FIG. 3. Learning refresher generation software 48 may further define a second trigger event by a time interval of 12 days after the initial playing event or by a time interval of 7 days after the first trigger event, for example. That is, a set of future trigger events can be defined based on the occurrence of a single video-based resource playing event or relative to previously-occurring trigger events or reminders.

Use Case: Insertion of Learning Refresher Item in a News Feed Module

Figure 4:
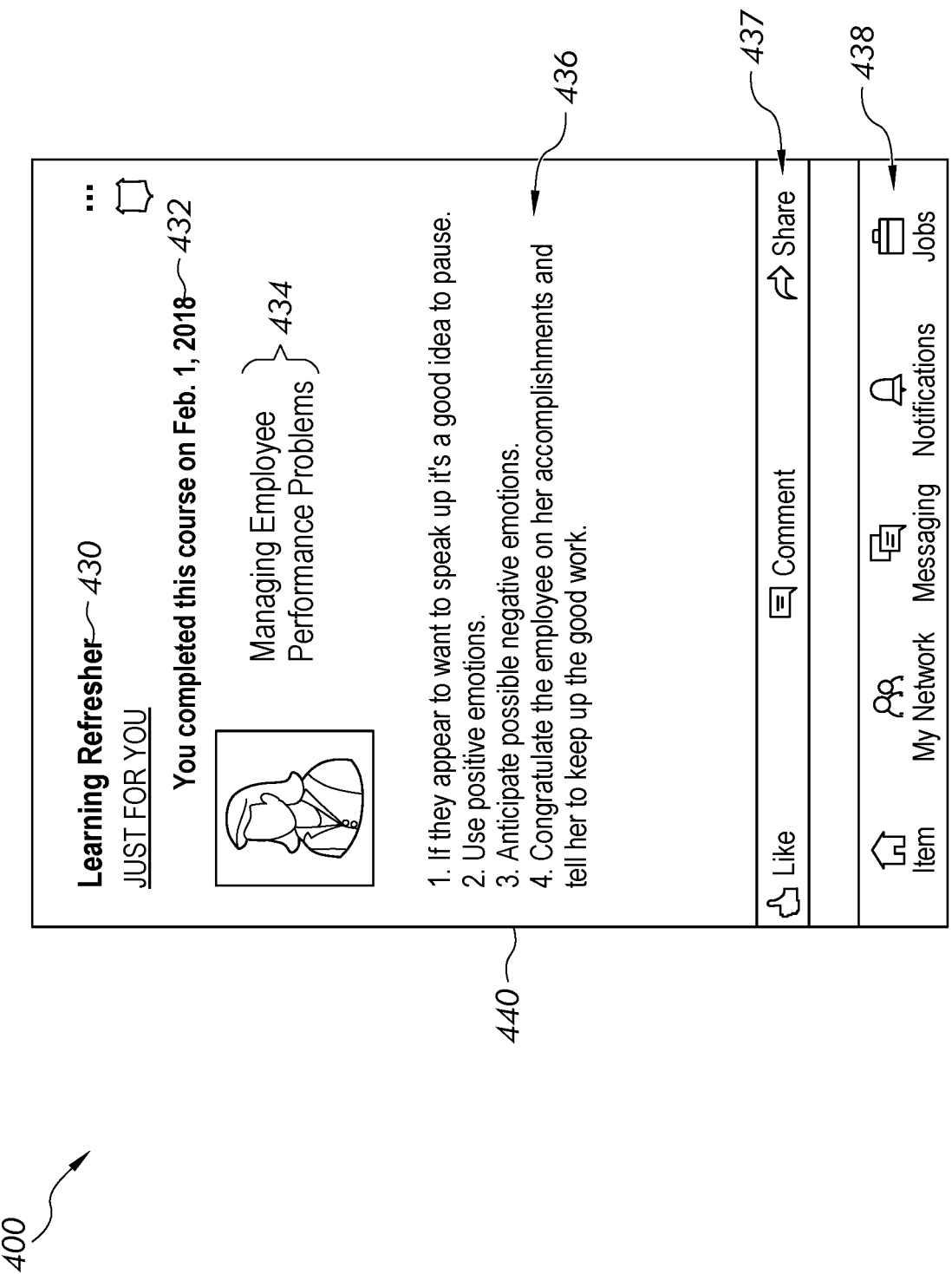
FIG. 4 is a screen capture of an example user interface that displays a learning refresher item, in an embodiment.

FIG. 4 is a screen capture of an example user interface that displays a learning refresher content module 400, in an embodiment. Learning refresher content module 400 is designed to be displayed in graphical user interface 130. Learning refresher content module 400 is embodied as feed module that includes a learning refresher portion 440, a feedback portion 437, and a feed module portion 438. Learning refresher portion 440 includes a learning refresher title 430, a course completion date notification 432, a course title hyperlink 434 and a set of learning refresher items 436. Activating the hyperlink 434 deep links to the portion of the video-based learning resource that discusses the learning refresher items 436.

The learning refresher items 436 are extracted from the video-based learning resource using the NLP-based techniques described above, in an embodiment. The feed module portion 438 contains a set of interactive icons that when activated initiate other functionality of the software application within which the learning refresher content module 400 is embedded.

The feedback portion 437 includes interactive graphical user interface elements that allow the end user to input explicit or implicit feedback data relating to the learning refresher item. Explicit feedback can be input by activating the "like" or "comment" GUI elements while implicit feedback can be inferred as a result of the user activating the "share" GUI element to share the item with another computing system user. In an embodiment, the computing system incorporates the feedback data received via any of the GUI mechanisms 437 into the process of generating the learning refresher content module 400. For example, the computing system adds, deletes, or modifies sentences contained in the learning refresher items that are presented to the user based on the feedback data received via any of the GUI mechanisms 437.

Benefits

Benefits that may be realized by at least some embodiments described herein include enhancing the integration of video-based learning resources with push messaging systems by automatically extracting sets of salient content items from the video-based learning resources and inserting the extracted items into push messages according to a schedule that is determined at least partly based on recall data.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hardwired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
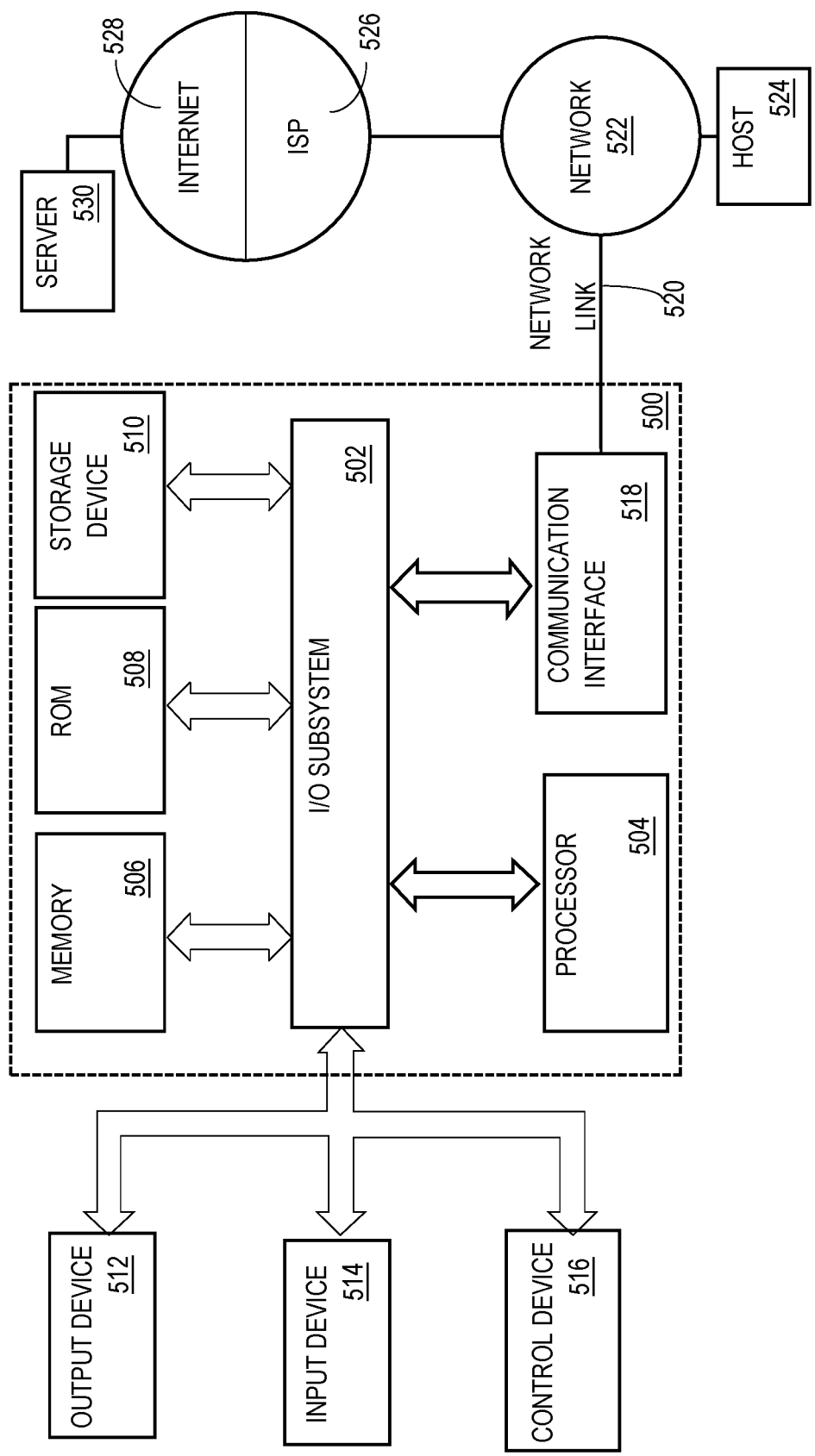
FIG. 5 is a block diagram that illustrates a computer system upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples or a combination of the described below.

In an example 1, a method includes: in response to a playing by a particular user, in learning software, of a video-based learning resource, determining, based at least partly on one or more of recall data and relevance data, a trigger event; in response to detection of the trigger event, causing a push messaging system to insert a learning refresher item that includes content extracted from the video-based learning resource into a push message, wherein the push messaging system causes the push message including the learning refresher item to be presented to the particular user; wherein the method is performed by one or more computing devices. The content may be an actionable topic. The content may be extracted from a portion of the video-based learning resource that was included in the playing of the video-based learning resource by the particular user.

An example 2 includes the method of example 1, wherein the trigger event is associated with a future timestamp that is computed by adding a time interval determined using the recall data to a timestamp associated with the playing of the video-based learning resource. An example 3 includes the method of example 2, wherein detection of the trigger event comprises determining that a current time stamp matches the future timestamp that is associated with the trigger event. An example 4 includes the method of any of examples 1-3, wherein the trigger event is associated with a future timestamp that is computed by adding a time interval determined using the recall data to a timestamp associated with a previous presentation, in a graphical user interface, of the learning refresher item. An example 5 includes the method of any of examples 1-4, wherein the recall data comprises a mapping of time intervals to confidence values, wherein the confidence values represent mathematically-computed likelihoods that one or more users will remember substantive content after the video-based learning resource is played, and wherein the confidence value is variable based at least partly on a number or a frequency of occurrences of trigger events after the playing of the video-based learning resource. An example 6 includes the method of any of examples 1-5, wherein the learning refresher item includes a link that, when activated, initiates presentation of a portion of the video-based learning resource that corresponds to the content extracted from the video-based learning resource that is included in the learning refresher item. An example 7 includes the method of any of examples 1-6, wherein different versions of the learning refresher item include different content extracted from the video-based learning resource and the method comprises inserting different versions of the learning refresher item into different push messages in response to different trigger events. An example 8 includes the method of any of examples 1-7, wherein the push message comprises a news feed or a push notification or a text message or an email message. An example 9 includes the method of any of examples 1-8, wherein the content extracted from the video-based learning resource is extracted from (i) the video-based learning resource or (ii) an electronic file created by a course instructor or a student, and the content is extracted using (i) an automated process involving natural language processing software or (ii) a manual process involving the course instructor or the student.

In an example 10, a system includes: one or more computer processors; a learning/messaging (L/M) interface coupled to the one or more computer processors, wherein the L/M interface performs operations comprising: in response to a playing by a particular user, in learning software, of a video-based learning resource, determining, based at least partly on recall data, a trigger event; in response to detection of the trigger event, causing a push messaging system to insert a learning refresher item that includes content extracted from the video-based learning resource into a push message, wherein the push messaging system causes the push message to be presented to the particular user.

An example 11 includes the system of example 10, wherein the trigger event is associated with a future timestamp that is computed by adding a time interval determined using the recall data to a timestamp associated with the playing of the video-based learning resource. An example 12 includes the system of example 10, wherein the trigger event is associated with a future timestamp that is computed by adding a time interval determined using the recall data to a timestamp associated with a previous trigger event. An example 13 includes the system of example 10 and includes modifying a presentation of the learning refresher item based on feedback input received from the particular user. An example 14 includes the system of example 10, wherein the learning refresher item includes a link that, when activated, initiates presentation of a portion of the video-based learning resource that corresponds to the content extracted from the video-based learning resource that is included in the learning refresher item, and wherein the push message comprises a news feed or a push notification or a text message or an email message.

In an example 15, a computer program product comprising: one or more non-transitory computer-readable storage media comprising instructions which, when executed by one or more processors, cause: in response to a playing by a particular user, in learning software, of a video-based learning resource, determining, based at least partly on recall data, a trigger event; in response to detection of the trigger event, causing a push messaging system to insert a learning refresher item that includes content extracted from the video-based learning resource into a push message, wherein the push messaging system causes the push message to be presented to the particular user.

An example 16 includes the computer program product of example 15, wherein the content extracted from the video-based learning resource is extracted using topic modeling software. An example 17 includes the computer program product of example 15, wherein the content extracted from the video-based learning resource is extracted by selecting a set of mathematically-computed most salient sentences from text-based content of the video-based learning resource. An example 18 includes the computer program product of example 17, wherein set of mathematically-computed most salient sentences is selected by matching sentences of the text-based content to a set of important topics. An example 19 includes the computer program product of example 18, wherein the set of important topics is determined by ranking topics extracted from the text-based content based on a computed measure of frequency of occurrence of the topics in the text-based content of the video-based learning resource. An example 20 includes the computer program product of example 19, wherein the topics are determined by grouping tri-grams extracted from the text-based content of the video-based learning resource based on a computed measure of semantic similarity.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   in response to a playing by a particular user of a video-based learning resource in learning software, determining a trigger event based at least partly on recall data;
   in response to detection of the trigger event, causing a push messaging system to insert, into a push message, a learning refresher item that includes an actionable topic extracted from a portion of the video-based learning resource that was included in the playing of the video-based learning resource by the particular user, wherein the push messaging system causes the push message to be presented to the particular user;
   wherein the method is performed by one or more computing devices.

2. The method of claim 1, wherein the trigger event is associated with a future timestamp that is computed by adding a time interval determined using the recall data to a timestamp associated with the playing of the video-based learning resource.

3. The method of claim 2, wherein detection of the trigger event comprises determining that a current time stamp matches the future timestamp that is associated with the trigger event.

4. The method of claim 1, wherein the trigger event is associated with a future timestamp that is computed by adding a time interval determined using the recall data to a timestamp associated with a previous presentation, in a graphical user interface, of the learning refresher item.

5. The method of claim 1, wherein the recall data comprises a mapping of time intervals to confidence values, wherein the confidence values represent mathematically-computed likelihoods that one or more users will remember substantive content after the video-based learning resource is played, and wherein the confidence value is variable based at least partly on a number or a frequency of occurrences of trigger events after the playing of the video-based learning resource.

6. The method of claim 1, wherein the learning refresher item includes a link that, when activated, initiates presentation of a portion of the video-based learning resource that corresponds to the content extracted from the video-based learning resource that is included in the learning refresher item.

7. The method of claim 1, wherein different versions of the learning refresher item include different content extracted from the video-based learning resource and the method comprises inserting different versions of the learning refresher item into different push messages in response to different trigger events.

8. The method of claim 1, wherein the push message comprises a news feed or a push notification or a text message or an email message.

9. The method of claim 1, wherein the content extracted from the video-based learning resource is extracted from (i) the video-based learning resource or (ii) an electronic file created by a course instructor or a student, and the content is extracted using (i) an automated process involving natural language processing software or (ii) a manual process involving the course instructor or the student.

10. A system comprising:
one or more computer processors;
a learning/messaging (L/M) interface coupled to the one or more computer processors, wherein the L/M interface performs operations comprising:
in response to a playing by a particular user, in learning software, of a video-based learning resource, determining, based at least partly on recall data, a trigger event;
in response to detection of the trigger event, causing a push messaging system to insert, into a push message, a learning refresher item that includes an actionable topic extracted from the video-based learning resource, wherein the push messaging system causes the push message to be presented to the particular user.

11. The system of claim 10, wherein the trigger event is associated with a future timestamp that is computed by adding a time interval determined using the recall data to a timestamp associated with the playing of the video-based learning resource.

12. The system of claim 10, wherein the trigger event is associated with a future timestamp that is computed by adding a time interval determined using the recall data to a timestamp associated with a previous trigger event.

13. The system of claim 10, wherein the L/M interface performs operations comprising modifying a presentation of the learning refresher item based on feedback input received from the particular user.

14. The system of claim 10, wherein the learning refresher item includes a link that, when activated, initiates presentation of a portion of the video-based learning resource that corresponds to the content extracted from the video-based learning resource that is included in the learning refresher item, and wherein the push message comprises a news feed or a push notification or a text message or an email message.

15. A computer program product comprising:
one or more non-transitory computer-readable storage media comprising instructions which, when executed by one or more processors, cause:
in response to a playing by a particular user, in learning software, of a video-based learning resource, determining, based at least partly on recall data, a trigger event;
in response to detection of the trigger event, causing a push messaging system to insert, into a push message, a learning refresher item that includes content extracted from a portion of the video-based learning resource that was included in the playing of the video-based learning resource by the particular user, wherein the push messaging system causes the push message to be presented to the particular user.

16. The computer program product of claim 15, wherein the content extracted from the video-based learning resource is extracted using topic modeling software.

17. The computer program product of claim 15, wherein the content extracted from the video-based learning resource is extracted by selecting a set of mathematically-computed most salient sentences from text-based content of the video-based learning resource.

18. The computer program product of claim 17, wherein set of mathematically-computed most salient sentences is selected by matching sentences of the text-based content to a set of important topics.

19. The computer program product of claim 18, wherein the set of important topics is determined by ranking topics extracted from the text-based content based on a computed measure of frequency of occurrence of the topics in the text-based content of the video-based learning resource.

20. The computer program product of claim 19, wherein the topics are determined by grouping tri-grams extracted from the text-based content of the video-based learning resource based on a computed measure of semantic similarity.

* * * * *